(12) United States Patent
Moriya et al.

(10) Patent No.: US 11,187,326 B2
(45) Date of Patent: Nov. 30, 2021

(54) MECHANICAL SEAL

(71) Applicant: EAGLE INDUSTRY CO., LTD., Tokyo (JP)

(72) Inventors: Osamu Moriya, Tokyo (JP); Akira Yoshino, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 126 days.

(21) Appl. No.: 16/612,748

(22) PCT Filed: May 8, 2018

(86) PCT No.: PCT/JP2018/017688
§ 371 (c)(1),
(2) Date: Nov. 11, 2019

(87) PCT Pub. No.: WO2018/207746
PCT Pub. Date: Nov. 15, 2018

(65) Prior Publication Data
US 2020/0200275 A1 Jun. 25, 2020

(30) Foreign Application Priority Data
May 12, 2017 (JP) .............................. JP2017-095986

(51) Int. Cl.
*F16J 15/34* (2006.01)
*F16J 15/36* (2006.01)

(52) U.S. Cl.
CPC ........... *F16J 15/3464* (2013.01); *F16J 15/36* (2013.01)

(58) Field of Classification Search
CPC .... F16J 15/344; F16J 15/3464; F16J 15/3472; F16J 15/36; F16J 15/38
See application file for complete search history.

(56) References Cited

U.S. PATENT DOCUMENTS 4,212,475 A * 7/1980 Sedy .................... F16J 15/3412
277/400
5,092,612 A * 3/1992 Victor .................. F16J 15/3412
277/400

(Continued)

FOREIGN PATENT DOCUMENTS

CN 105333153 A 2/2016
CN 205089979 U 3/2016
(Continued)

OTHER PUBLICATIONS

Chinese Office Action dated Jul. 10, 2020 (corresponding to CN201880030400.3).
(Continued)

*Primary Examiner* — Nicholas L Foster
(74) *Attorney, Agent, or Firm* — Harness, Dickey & Pierce, P.L.C.

(57) ABSTRACT

A mechanical seal in which a rotary ring can be more reliably positioned. A rotary ring unit 100 includes: a sleeve 120 fixed to a rotary shaft 500; and a rotary ring 110 of which a movement in an axial direction and a rotation with respect to the sleeve 120 is restricted, a fixed ring unit 200 includes: a fixed ring 210 configured to slide on an end surface of the rotary ring 110; and a bellows 250 which presses the fixed ring 210 toward the rotary ring 110, and the sleeve 120 is provided with a stopper 140 which restricts a movement of the rotary ring 110 toward the fixed ring 210.

6 Claims, 2 Drawing Sheets

(56) References Cited

U.S. PATENT DOCUMENTS

| | | | |
|---|---|---|---|
| 5,180,173 A * | 1/1993 | Kimura | F16J 15/3412 277/400 |
| 5,224,714 A * | 7/1993 | Kimura | F16J 15/3412 277/400 |
| 5,368,314 A * | 11/1994 | Victor | F16J 15/3412 277/400 |
| 5,435,574 A * | 7/1995 | Victor | F16J 15/3412 277/379 |
| 5,490,679 A | 2/1996 | Borrino et al. | |
| 5,533,739 A * | 7/1996 | Sedy | F16J 15/3472 277/390 |
| 6,145,841 A | 11/2000 | Maeda | |
| 6,425,583 B1 * | 7/2002 | Muraki | F16J 15/3412 277/358 |
| 6,848,689 B2 * | 2/2005 | Auber | F16J 15/3464 277/358 |
| 9,927,030 B2 * | 3/2018 | Yoshino | F16J 15/164 |
| 10,344,867 B2 * | 7/2019 | Itadani | F04D 29/128 |
| 2012/0163904 A1 | 6/2012 | Liang et al. | |
| 2013/0161912 A1 | 6/2013 | Sauter et al. | |
| 2015/0211638 A1 | 7/2015 | Itadani et al. | |
| 2016/0230892 A1 * | 8/2016 | Yoshino | F16J 15/348 |
| 2016/0281856 A1 | 9/2016 | Itadani et al. | |
| 2018/0106374 A1 * | 4/2018 | Itadani | F16J 15/3412 |
| 2018/0106378 A1 | 4/2018 | Itadani et al. | |

FOREIGN PATENT DOCUMENTS

| | | |
|---|---|---|
| CN | 205331037 U | 6/2016 |
| CN | 106246922 A | 12/2016 |
| CN | 106605089 A | 4/2017 |
| EP | 0390243 A2 | 10/1990 |
| EP | 0989343 A1 | 3/2000 |
| JP | S58118375 A | 7/1983 |
| JP | H07-229566 A | 8/1995 |
| JP | H11-351407 A | 12/1999 |
| JP | 2000-074226 A | 3/2000 |
| JP | 2011-074966 A | 4/2011 |
| WO | 2014/054745 A1 | 4/2014 |

OTHER PUBLICATIONS

Extended European Search Report dated Dec. 18, 2020 (corresponding to EP 18798669.0).

* cited by examiner

MECHANICAL SEAL

CROSS-REFERENCE TO RELATED APPLICATIONS

This application is a National Stage of International Application No. PCT/JP2018/017688, filed May 8, 2018 (now WO 2018/207746 A1), which claims priority to Japanese Application No. 2017-095986, filed May 12, 2017. The entire disclosures of each of the above applications are incorporated herein by reference.

FIELD

The present disclosure relates to a mechanical seal for sealing an annular gap between a rotary shaft and a housing.

BACKGROUND

A mechanical seal is provided with a rotary ring that rotates with a rotary shaft. A tension force of a gasket and a pressing force received from a pressing member that presses a fixed ring generally prevent the rotary ring from moving in an axial direction and rotating. In addition, the rotary ring is positioned particularly in a radial direction by a gasket made of an elastic body which is fitted and fixed with respect to a sleeve fixed to the rotary shaft.

However, when the rotary ring is subjected to large fluid pressure toward the fixed ring, the rotary ring may become tilted, and then sealing performance may decline. Further, the gasket may slip out from the sleeve.

CITATION LIST

Patent Literature

[PTL 1] Japanese Patent Application Laid-open No. 2000-74226
[PTL 2] WO 2014/54745

SUMMARY

Technical Problem

An object of the present disclosure is to provide a mechanical seal in which a rotary ring can be more reliably positioned.

Solution to Problem

In order to solve the problem described above, the present disclosure adopts the following means.

Specifically, a mechanical seal according to the present disclosure is a mechanical seal for sealing an annular gap between a rotary shaft and a housing having a shaft hole into which the rotary shaft is to be inserted, the mechanical seal including: a rotary ring unit mounted on the rotary shaft; and a fixed ring unit mounted on the housing, wherein the rotary ring unit includes: a sleeve fixed to the rotary shaft; and a rotary ring of which a movement in an axial direction and a rotation with respect to the sleeve is restricted, the fixed ring unit includes: a fixed ring configured to slide on an end surface of the rotary ring; and a pressing member which presses the fixed ring toward the rotary ring, and the sleeve is provided with a stopper which restricts a movement of the rotary ring toward the fixed ring.

According to the present disclosure, the stopper can restrict a movement of the rotary ring toward the fixed ring.

The stopper may include: an annular part facing a fixed-ring-side end surface of the rotary ring; and an inclined part extending from a radially-inner-side end of the annular part in a direction away from the rotary ring and toward radially inner side, and the inclined part and the sleeve may be fixed to each other by a welded part.

Accordingly, a movement of the rotary ring is restricted by the annular part of the stopper fixed with respect to the sleeve by the welded part.

The inclined part may have a plurality of protrusions respectively provided at intervals, and the plurality of protrusions may be respectively fixed to the sleeve by the welded part.

Accordingly, even in a case where the stopper is press-fitted with respect to the sleeve, a press fit load can be prevented from becoming excessively large. Therefore, the stopper can be prevented from being in contact with the rotary ring with a large force.

The sleeve may include: a small-diameter part fixed to an outer circumferential surface of the rotary shaft; a large-diameter part which is provided on the rotary ring side with respect to the small-diameter part and which is larger in diameter than the small-diameter part; and a tapered connecting part which connects the small-diameter part and the large-diameter part to each other, and the inclined part of the stopper may be fixed to the connecting part.

Accordingly, the inclined part of the stopper can be more reliably brought into contact with the connecting part of the sleeve, thus an occurrence of a weld defect can be suppressed.

The sleeve may have an outward flange part at an end of the large-diameter part on an opposite side of the small-diameter part, and the rotary ring unit may include a gasket made of an elastic body which has a cylindrical seal part which seals a gap between an inner circumferential surface of the rotary ring and an outer circumferential surface of the large-diameter part of the sleeve and a flange-shaped seal part which seals a gap between an end surface of the rotary ring and the outward flange part of the sleeve.

Accordingly, a gap between the sleeve and the rotary ring can be sealed by the gasket. In addition, since a state is created in which the flange-shaped seal part of the gasket is sandwiched between the outward flange part of the sleeve and the rotary ring, a movement of the gasket in addition to a movement of the rotary ring is restricted by the stopper.

It should be noted that the respective configurations described above can be adopted in combination with each other to the greatest extent feasible.

Advantageous Effects of the Disclosure

As described above, according to the present disclosure, a rotary ring can be more reliably positioned.

DRAWINGS

DETAILED DESCRIPTION

Hereinafter, a mode for implementing the present disclosure will be described in detail by way of example of an embodiment with reference to the drawings. However, it is to be understood that dimensions, materials, shapes, relative arrangements, and the like of components described in the embodiment are not intended to limit the scope of the disclosure thereto unless otherwise specifically noted.

Embodiment

Figure 1:
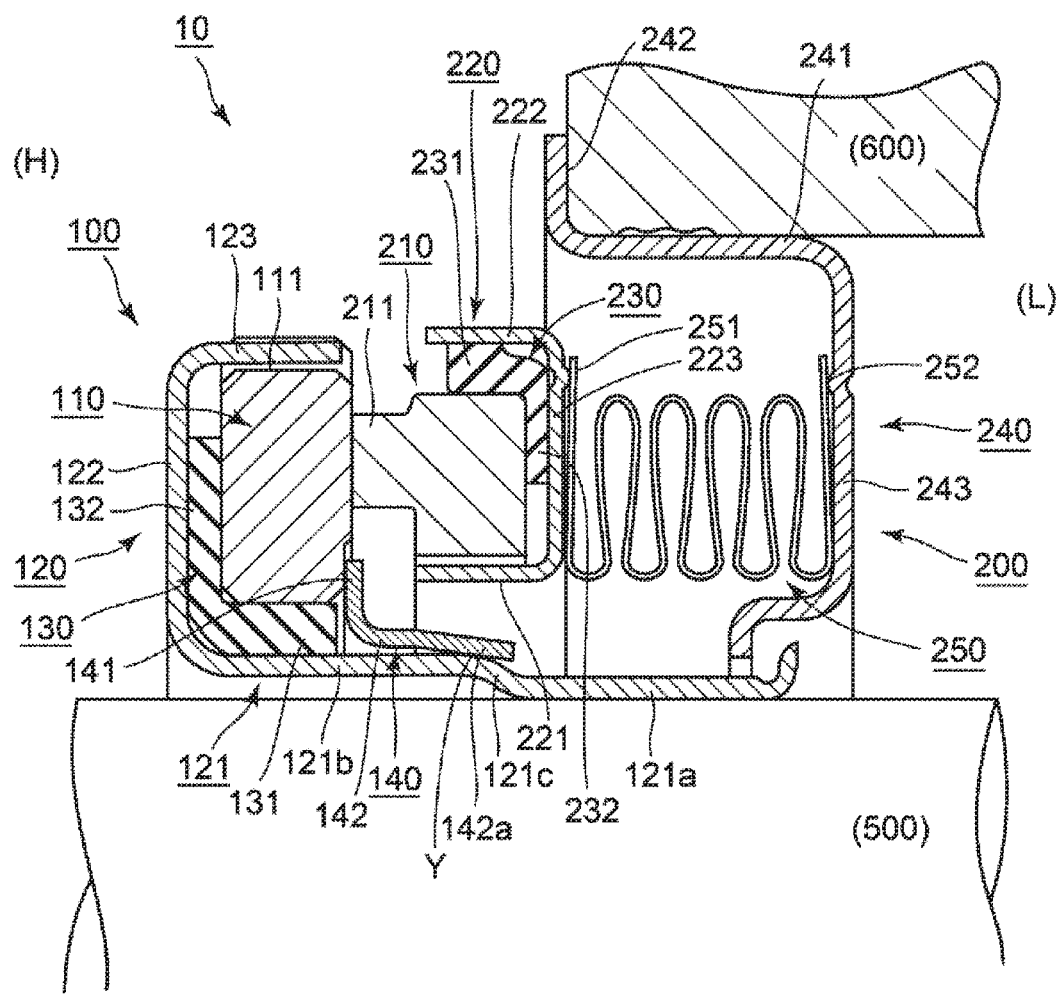
FIG. 1 is a schematic sectional view showing a state of use of a mechanical seal according to an embodiment of the present disclosure.
Figure 2:
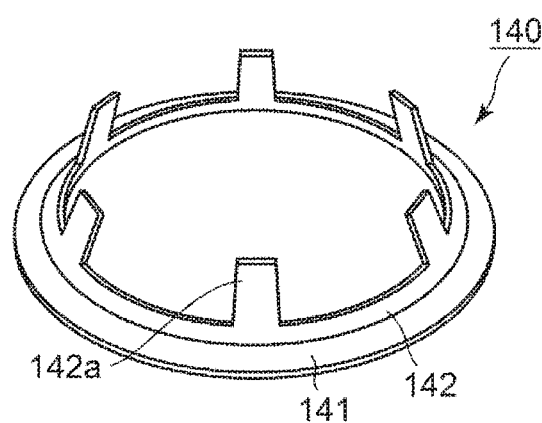
FIG. 2 is a perspective view of a stopper according to the embodiment.

A mechanical seal according to an embodiment of the present disclosure will be described with reference to FIGS. 1 and 2. FIG. 1 is a schematic sectional view showing a state of use of a mechanical seal according to an embodiment of the present disclosure. The mechanical seal has a rotationally symmetrical shape with the exception of some members thereof, and FIG. 1 represents a sectional view of the mechanical seal cut along a plane including a central axial line of the mechanical seal. FIG. 2 is a perspective view of a stopper according to the embodiment of the present disclosure. It should be noted that, in the following description, a direction in which the central axial line of the mechanical seal (which matches a central axial line of a rotary shaft) extends will be referred to as an "axial direction".

<Mechanical Seal>

An overall configuration of a mechanical seal 10 will be described. The mechanical seal 10 seals an annular gap between a rotary shaft 500 and a housing 600 having a shaft hole for the rotary shaft 500. A left-side region and a right-side region in FIG. 1 are separated from each other since the annular gap between the rotary shaft 500 and the housing 600 is sealed by the mechanical seal 10. A sealed fluid is sealed in the left-side region and the right-side region is exposed to the air. Since pressure in the left side region is high, the left side in FIG. 1 will be referred to as a high pressure side (H) and the right side will be referred to as a low pressure side (L) when appropriate.

The mechanical seal 10 includes a rotary ring unit 100 which is mounted on the rotary shaft 500 and a fixed ring unit 200 which is mounted on the housing 600. When the rotary shaft 500 rotates, the rotary ring unit 100 rotates together with the rotary shaft 500, while the fixed ring unit 200 remains in a stationary state.

<Rotary Ring Unit>

The rotary ring unit 100 includes a metallic sleeve 120 which is fixed to the rotary shaft 500 and a rotary ring 110 of which a movement in an axial direction and a rotation with respect to the sleeve 120 is restricted. The rotary ring 110 is made of a hard material such as Sic, carbon, or metal. The rotary ring unit 100 is provided with a gasket 130 made of an elastic body (for example, rubber) which seals a gap between the sleeve 120 and the rotary ring 110 and a metallic stopper 140 which restricts a movement of the rotary ring 110 toward the low pressure side (L).

The sleeve 120 includes a cylindrical part 121, which has approximately cylindrical shape, an outward flange part 122 which extends radially outwardly from an end on the high pressure side (H) of the cylindrical part 121, and a locking projection 123 which extends toward the low pressure side (L) from a distal end of the outward flange part 122. The cylindrical part 121 includes a small-diameter part 121a, a large-diameter part 121b, which is larger in diameter than the small-diameter part 121a, and a connecting part 121c which connects the small-diameter part 121a and the large-diameter part 121b to each other. The small-diameter part 121a is fixed by fitting to an outer circumferential surface of the rotary shaft 500. The large-diameter part 121b is provided on the rotary ring 110 side with respect to the small-diameter part 121a. The connecting part 121c includes a tapered portion of which a diameter increases with distance from the small-diameter part 121a toward the large-diameter part 121b.

The rotary ring 110 includes an approximately cylindrical member. A groove 111 to be locked which extends in the axial direction is formed on an outer circumferential surface of the rotary ring 110. The locking projection 123 of the sleeve 120 is locked in the groove 111. Accordingly, a rotation of the rotary ring 110 with respect to the sleeve 120 is restricted.

The gasket 130 includes a cylindrical seal part 131 with a cylindrical shape and a flange-shaped seal part 132. The cylindrical seal part 131 seals a gap between an inner circumferential surface of the rotary ring 110 and an outer circumferential surface of the large-diameter part 121b of the sleeve 120. The flange-shaped seal part 132 seals a gap between an end surface on the high pressure side (H) of the rotary ring 110 and the outward flange part 122 of the sleeve 120.

The stopper 140 includes a plate-shaped annular part 141 and an inclined part 142 which extends in a tapered manner such that a diameter thereof decreases from a radially-inner-side end of the annular part 141. The stopper 140 is press-fitted with respect to the sleeve 120 and fixed to the sleeve 120 by welding. The annular part 141 of the stopper 140 faces a low-pressure-side (L) end surface (a fixed-ring-210-side end surface) of the rotary ring 110. The inclined part 142 extends from a radially-inner-side end of the annular part 141 in a direction away from the rotary ring 110 and toward radially inner side. The inclined part 142 and the sleeve 120 are fixed to each other by a welded part Y. The inclined part 142 has a plurality of protrusions 142a respectively provided at intervals. The plurality of protrusions 142a are respectively fixed to the sleeve 120 by the welded part Y. Specifically, the plurality of protrusions 142a are fixed to the connecting part 121c of the sleeve 120.

<Fixed Ring Unit>

The fixed ring unit 200 includes the fixed ring 210 configured to slide on the end surface of the rotary ring 110. The fixed ring 210 is made of a hard material such as Sic, carbon, or metal. The fixed ring 210 includes an annular protrusion 211 which protrudes toward the rotary ring 110. When the rotary shaft 500 rotates, a distal end surface of the protrusion 211 and the fixed-ring-210-side end surface of the rotary ring 110 slide on each other.

The fixed ring unit 200 includes a metallic case 220 for housing the fixed ring 210 and a gasket 230 made of an elastic body which causes the fixed ring 210 to be positioned with respect to the case 220 and which seals a gap between the case 220 and the fixed ring 210. The case 220 includes an annular member with an approximately C-shaped cross section having a small-diameter part 221, a large-diameter part 222 larger in diameter than the small-diameter part 221, and a connecting part 223 which connects the small-diameter part 221 and the large-diameter part 222 to each other. The fixed ring 210 is housed in the case 220. The gasket 230 includes a cylindrical seal part 231 which seals a gap between an outer circumferential surface of the fixed ring 210 and an inner circumferential surface of the large-diameter part 222 of the case 220 and a flange-shaped seal part 232 which seals a gap between a low-pressure-side (L) side end surface of the fixed ring 210 and the connecting part 223 of the case 220.

The fixed ring unit 200 includes a metallic cartridge 240 for configuring the mechanical seal 10 as a cartridge. The cartridge 240 includes a cylinder part 241 configured to be fitted and fixed to an inner circumferential surface of the shaft hole of the housing 600, an outward flange part 242 which is provided at a high-pressure-side (H) end of the cylinder part 241, and an inward flange part 243 which is provided at a low-pressure-side (L) end of the cylinder part 241. The mechanical seal 10 can be positioned with respect to the housing 600 by press fitting the cartridge 240 into the shaft hole of the housing 600 until the outward flange part 242 abuts against an end surface of the housing 600. Disengagement of the sleeve 120 and the cartridge 240 can be prevented by performing a bending process to bend a distal end of the small-diameter part 121a of the sleeve 120 radially outwardly after the various members constituting the mechanical seal 10 are assembled. This configures the mechanical seal 10 as a cartridge which can be handled as an integrated unit.

The fixed ring unit 200 has a metallic bellows 250 as a pressing member which presses the fixed ring 210 toward the rotary ring 110. Of the bellows 250, one end 251 is fixed to the connecting part 223 of the case 220 by welding and another end 252 is fixed to the inward flange part 243 of the cartridge 240 by welding. In a state where the mechanical seal 10 is installed in the rotary shaft 500 and the housing 600, the bellows 250 enters a compressed state. Accordingly, the case 220 is pressed toward the high pressure side (H) by a spring force of the bellows 250. Thus, the fixed ring 210 is pressed toward the rotary ring 110 by the bellows 250 through the case 220 and the gasket 230. The bellows 250 has a function as a seal which separates an outer circumferential surface side of the bellows 250 from an inner circumferential surface side of the bellows 250.

Advantages of Mechanical Seal According to Present Embodiment

The stopper 140 of the mechanical seal 10 can restrict the rotary ring 110 from moving toward the fixed ring 210. Because of a sealed fluid present between the end surface on the high pressure side (H) of the rotary ring 110 and the outward flange part 122 of the sleeve 120, the rotary ring 110 is subjected a force toward the low pressure side (L) when fluid pressure on the high pressure side (H) is high. Thus, without the stopper 140, the rotary ring 110 may tilt and sealing performance may decline. On the contrary, the present embodiment is provided with the stopper 140. This restricts a movement of the rotary ring 110 and a tilt of the rotary ring 110 or the like. Therefore, a stable sealing performance can be achieved.

The stopper 140 includes the annular part 141 and the inclined part 142, and the inclined part 142 and the sleeve 120 are fixed to each other by the welded part Y. The inclined part 142 has a plurality of protrusions 142a respectively provided at intervals, and the plurality of protrusions 142a are respectively fixed to the sleeve 120 by the welded part Y. This prevents a press fit load from becoming excessively large when the stopper 140 is press-fitted with respect to the sleeve 120. Accordingly, the stopper 140 is prevented from being in contact with the rotary ring 110 with a large force. As a result, chipping and cracking of the rotary ring 110 can be suppressed and, at the same time, the rotary ring 110 can be prevented from tilting.

The inclined part 142 of the stopper 140 is fixed to the tapered connecting part 121c of the sleeve 120. This enables the inclined part 142 of the stopper 140 to be more reliably brought into contact with the connecting part 121c of the sleeve 120, thus an occurrence of a weld defect can be suppressed.

In addition, in the present embodiment, a state is created in which the flange-shaped seal part 132 of the gasket 130 is sandwiched between the outward flange part 122 of the sleeve 120 and the rotary ring 110. Accordingly, the stopper 140 can restrict a movement of the gasket 130 in addition to a movement of the rotary ring 110. As a result, the gasket 130 is prevented from slipping out from the sleeve 120.

OTHER

Although above described embodiment includes a bellows as a pressing member, other pressing member such as a spring may be used.

REFERENCE SIGNS LIST

10 Mechanical seal
100 Rotary ring unit
110 Rotary ring
111 Groove
120 Sleeve
121 Cylindrical part
121a Small-diameter part
121b Large-diameter part
121c Connecting part
122 Outward flange part
123 Locking projection
130 Gasket
131 Cylindrical seal part
132 Flange-shaped seal part
140 Stopper
141 Annular part
142 Inclined part
142a Protrusion
200 Fixed ring unit
210 Fixed ring
211 Protrusion
220 Case
221 Small-diameter part
222 Large-diameter part
223 Connecting part
230 Gasket
231 Cylindrical seal part
232 Flange-shaped seal part
240 Cartridge
241 Cylinder part
242 Outward flange part
243 Inward flange part
250 Bellows
251 One end
252 Another end
500 Rotary shaft
600 Housing
Y Welded part

The invention claimed is:

1. A mechanical seal configured to seal an annular gap between a rotary shaft and a housing having a shaft hole into which the rotary shaft is to be inserted, the mechanical seal comprising:
a rotary ring unit configured to be mounted on the rotary shaft; and
a fixed ring unit configured to be mounted on the housing, wherein:
the rotary ring unit includes:
a sleeve configured to be fixed to the rotary shaft; and
a rotary ring of which a movement in an axial direction and a rotation with respect to the sleeve is restricted;

the fixed ring unit includes:
a fixed ring configured to slide on an end surface of the rotary ring; and
a pressing member which presses the fixed ring toward the rotary ring;
the sleeve is provided with a stopper which restricts a movement of the rotary ring toward the fixed ring, the stopper includes:
an annular part facing a fixed-ring-side end surface of the rotary ring; and
an inclined part extending from a radially-inner-side end of the annular part in a direction away from the rotary ring and toward radially inner side, and
the inclined part and the sleeve are fixed to each other by a welded part.

2. The mechanical seal according to claim 1, wherein
the inclined part has a plurality of protrusions respectively provided at intervals, and
the plurality of protrusions are respectively fixed to the sleeve by the welded part.

3. The mechanical seal according to claim 1, wherein
the sleeve includes:
a small-diameter part configured to be fixed to an outer circumferential surface of the rotary shaft;
a large-diameter part which is provided on the rotary ring side with respect to the small-diameter part and which is larger in diameter than the small-diameter part; and
a tapered connecting part which connects the small-diameter part and the large-diameter part to each other, and
the inclined part of the stopper is fixed to the connecting part.

4. The mechanical seal according to claim 3, wherein
the sleeve has an outward flange part at an end of the large-diameter part on an opposite side of the small-diameter part, and
the rotary ring unit includes a gasket made of an elastic body which has a cylindrical seal part which seals a gap between an inner circumferential surface of the rotary ring and an outer circumferential surface of the large-diameter part of the sleeve and a flange-shaped seal part which seals a gap between an end surface of the rotary ring and the outward flange part of the sleeve.

5. The mechanical seal according to claim 2, wherein
the sleeve includes:
a small-diameter part configured to be fixed to an outer circumferential surface of the rotary shaft;
a large-diameter part which is provided on the rotary ring side with respect to the small-diameter part and which is larger in diameter than the small-diameter part; and
a tapered connecting part which connects the small-diameter part and the large-diameter part to each other, and
the inclined part of the stopper is fixed to the connecting part.

6. The mechanical seal according to claim 5, wherein
the sleeve has an outward flange part at an end of the large-diameter part on an opposite side of the small-diameter part, and
the rotary ring unit includes a gasket made of an elastic body which has a cylindrical seal part which seals a gap between an inner circumferential surface of the rotary ring and an outer circumferential surface of the large-diameter part of the sleeve and a flange-shaped seal part which seals a gap between an end surface of the rotary ring and the outward flange part of the sleeve.

* * * * *